United States Patent
Sakurai et al.

(10) Patent No.: US 7,052,817 B2
(45) Date of Patent: May 30, 2006

(54) INFORMATION RECORDING MEDIUM AND METHOD OF PRODUCING THE SAME

(75) Inventors: Kunio Sakurai, Ashigarakami-gun (JP); Tomoo Kobayashi, Minamiashigara (JP); Kaoru Torikoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 187 days.

(21) Appl. No.: 10/669,728

(22) Filed: Sep. 25, 2003

(65) Prior Publication Data

US 2004/0161690 A1    Aug. 19, 2004

(30) Foreign Application Priority Data

Feb. 18, 2003    (JP) .............................. 2003-039801

(51) Int. Cl.
*G03G 13/00* (2006.01)

(52) U.S. Cl. ................ 430/124; 430/97; 430/48; 430/56; 369/272.1; 369/273

(58) Field of Classification Search ................ 430/124, 430/97, 48, 56; 369/272.1, 273
See application file for complete search history.

(56) References Cited

U.S. PATENT DOCUMENTS

| | | | |
|---|---|---|---|
| 4,480,003 A | 10/1984 | Edwards et al. | |
| 4,973,141 A | 11/1990 | Baucke et al. | |
| 5,104,731 A | 4/1992 | Gager | |
| 5,378,576 A | 1/1995 | Sakai et al. | |
| 5,731,116 A * | 3/1998 | Matsuo et al. | 430/56 |
| 6,074,066 A | 6/2000 | Macher et al. | |
| 6,350,522 B1 | 2/2002 | Kyu-seok et al. | |
| 6,395,387 B1 | 5/2002 | Mochizuki | |
| 6,524,760 B1 * | 2/2003 | Ikeuchi et al. | 430/41 |
| 6,656,649 B1 * | 12/2003 | Ohishi et al. | 430/56 |
| 2001/0044031 A1 | 11/2001 | Ikeuchi et al. | |
| 2002/0182520 A1 * | 12/2002 | Torikoshi | 430/18 |
| 2004/0126690 A1 | 7/2004 | Kobayashi et al. | |

FOREIGN PATENT DOCUMENTS

| | | |
|---|---|---|
| EP | 0104 074 A2 | 3/1984 |
| EP | 0 474 278 A1 | 3/1992 |
| EP | 0 969 330 A1 | 1/2000 |
| EP | 1 022 618 A1 | 7/2000 |
| GB | 1 423 403 | 2/1976 |
| JP | A 58-102245 | 6/1983 |
| JP | 61-239230 | 10/1986 |
| JP | A 5-98050 | 4/1993 |
| JP | A 7-89209 | 4/1995 |
| JP | A 7-266723 | 10/1995 |
| JP | A 10-86562 | 4/1998 |
| JP | A 11-334265 | 12/1999 |
| JP | A 2001-92255 | 4/2001 |
| WO | WO 93/21557 | 10/1993 |

* cited by examiner

OTHER PUBLICATIONS

European Search Report Dated Dec. 5, 2003 EP 03 02 0708.

*Primary Examiner*—Mark A. Chapman
(74) *Attorney, Agent, or Firm*—Oliff & Berridge, PLC (57) ABSTRACT

An information recording medium including at least one electrophotographic laminate film in which a surface resistance of at least one surface is in a range of $10^8$ to $10^{13}$ $\Omega/\square$, and on which a toner image corresponding to information is formed; and an opaque core base material laminated on the surface of the electrophotographic laminate film, on which surface the toner image is formed.

16 Claims, 2 Drawing Sheets

INFORMATION RECORDING MEDIUM AND METHOD OF PRODUCING THE SAME

CROSS-REFERENCE TO RELATED APPLICATION

This application claims priority under 35USC 119 from Japanese Patent Application No. 2003-39801, the disclosure of which is incorporated by reference herein.

BACKGROUND OF THE INVENTION

1. Field of the Invention

The present invention relates to an electrophotographic information recording medium comprising forming (recording) an image directly thereon by using an electrophotographic system image forming device. The present invention relates particularly to a non-contact or contact type information recording medium containing private information and image information such as a cash card, employee identification card, student identification card, individual membership card, residence certificate, various driver's licenses and various qualification certificates that contain a photograph of a holder's face, and further, to an electrophotographic information recording medium used for a personal identification image sheet and image display board and a display label used in medical sites and the like. The present invention also encompasses a method of producing these information recording media.

2. Description of the Related Art

Along with the development of recent image forming technologies, measures taken to form images having the same qualities in a large amount at low cost by using various printing methods such as intaglio printing, relief-printing, planographic printing, gravure printing and screen printing have been known. Many such printing methods are used for surface printing of information recording media, such as IC cards, magnetic cards, optical cards or cards composed of combinations of these cards, which store predetermined information and can communicate with external devices in a contact or non-contact system.

However, for example, the screen printing requires many printing plates corresponding to the number of images which it is intended to print. In the case of color printing, printing plates in accordance with the number of the colors are further required. For this reason, these printing methods are not suitable for printing personal identification information (e.g., photographs of the face, name, residence, date of one's birth and various kinds of licenses).

In light of the above problems, currently most major image forming methods employ printers and the like utilizing a sublimation type or melt type thermal transfer system using an ink ribbon or the like. These methods enable personal identification information to be printed with ease. However, these image forming methods still have a problem that resolution deteriorates when increasing printing speed whereas printing speed decreases when raising resolution.

In the meantime, image forming (printing) using an electrophotographic system is accomplished by the following process: the surface of a latent image holding member is charged evenly, exposed to light corresponding to image signals to form an electrostatic latent image by the potential difference between the exposed part and the unexposed part, and then a color powder (image forming material), called a toner, having polarity opposite (or the same) to (as) that of the above charge is subjected to electrostatic developing to thereby form a visible image (toner image) on the surface of the latent image holding member. In the case of a color image, image forming is accomplished using a method in which the above step is repeated or plural image forming devices are arranged in parallel to thereby form a color visible image, which is then transferred and fixed (fixation: solidification of the color powder by melting using heat and cooling) to an image recording material to thereby obtain a color image.

In the electrophotographic system as described above, the electrostatic latent image on the surface of the latent image holding member is electrically formed by image signals. Therefore, not only the same image can be formed repeatedly but also it is possible to cope with different images with ease to form an image. A toner image formed on the latent image holding member can be transferred almost perfectly to the surface of the image recording material and also a little toner image left on the surface of the latent image holding member can be easily removed using a resin blade or a brush. By using the electrophotographic system it is easy to produce print products appropriate for multi-product low-volume production.

Also, the aforementioned toner is usually formed by melting and mixing a heat-meltable resin, a pigment and, when necessary, additives such as a charge regulator and crushing the kneaded product to micronize. Furthermore, the electrostatic latent image in the above electrophotographic system has considerably higher resolution than the aforementioned micronized toner. It can be expected to obtain sufficient resolution compared with that obtained in the aforementioned screen printing or the aforementioned thermal transfer system using an ink ribbon.

With respect to a color image, four primary colors, namely cyan, magenta, yellow and black, are used for color toners and color toners having these colors are mixed whereby the same color as in the case of printing can be theoretically reproduced. Also, in the case of the above color toner, it is easy to increase image-masking ability by means of a toner because a toner resin and a pigment can be compounded relatively freely.

Little study has been made yet as to heat resistance and light resistance on the assumption of outdoor use. Particularly when driver's license and the like are left on a place exposed to the direct rays of the sun in a car, an image in thermal transfer system using a dye as a colorant is faded. However, in a color image output in an electrophotographic system, pigments superior in light resistance corresponding to each color of cyan, magenta, yellow and black are used. It is therefore considered that the image recording material in an electrophotographic system has satisfactorily superior light resistance. Similarly, the heat resistance of the image recording material is considered to be improved to a level at which the image recording material can be used outdoors.

The core base material for various kinds of cards used most frequently at present is a vinyl chloride sheet. This is because the vinyl chloride sheet is superior in printing characteristics and also in adaptability to embossing processing (processing of irregularities such as characters). However, the vinyl chloride sheet has a problem that it generates dioxins when incinerated in a furnace and the like for waste disposal resulting from, for example, the expiration of the time limit. Therefore, various sheet films are used at present as materials excluding the vinyl chloride from the viewpoint of coping with the environment.

In a case where embossing processing is not to be applied, a conventional biaxial oriented PET (polyethylene terephthalate) film and the like may be used. However, embossing processing is essential in many cases to retain the functions of conventional cards. At present, therefore, ABS films and polyolefin resin films which are softened at relatively low temperatures, modified PET resin films called PETG and integrally formed films of a modified PET film and a PET film, an amorphous PET resin film or a polycarbonate resin film come to be used.

The following examples are given as examples using the aforementioned electrophotographic device to carry out printing of various cards.

Japanese Patent Application Laid-Open (JP-A) No. 11-334265 proposes a method in which personal identification information is printed on a light-transmittable sheet and further, printed as a mirror image, which is then applied to the surface of a base material having an IC memory to make a card.

As a method of producing cards including IC cards, a method is known in which an image is formed on a plastic sheet and then applied to or laminated on a card base material (see, for example, JP-A Nos. 7-266723 and 2001-92255). Also, a method is generally known in which a print surface obtained by printing an image as a mirror image on a light-transmittable sheet is laminated on a card base material or a foil substrate to make cards or display media (see, for example, JP-A Nos. 10-86562 and 7-89209).

In the aforementioned method of producing a card by using the electrophotographic system, the surface resistance of each transfer film is not defined and the above-exemplified polyester, ABS, and vinyl chloride type film is usually an insulating body. When such an insulating body is used as an electrophotographic transfer film, a toner-transfer defect may be caused. Moreover, the electrostatic adsorption power of a transfer film after the transfer process and fixing process of a toner image becomes excessively large, resulting in that a transfer film is easily adhered with another transfer film or with a base material, to which the transfer film is to be laminated, at undesirable portions.

For this reason, it is sometimes difficult to align the transfer film with the base material at a desired position to laminate by an automatic operation, for instance, to align a personal identification information image with a corresponding IC memory exactly. It is, thus, necessary to make alignment by a hand operation, posing the problem that a laminate position is inexact and working efficiency is significantly decreased. There has also been a problem that dirt such as dusts is easily adsorbed by static electrification and therefore the finish quality of cards is deteriorated.

SUMMARY OF THE INVENTION

It is an object of the present invention to solve the problems described in the above. In other words, it is an object of the invention to provide an electrophotographic information recording medium capable of producing a high-quality and reliable image by using a conventional electrophotographic device without substantially remodeling the device. It is also an object to provide, particularly, an information recording medium comprising an electrophotographic laminate film and a core base material. The electrophotographic laminate film should be less affected by electrostatic adhesion so as to be easily aligned for lamination and resistant to adhesion of dirt such as dusts caused by static electricity when being laminated with a core base material in the later step. Additionally, it is also an object to provide a method of producing such an information recording medium.

The above objects can be attained by the present invention described hereinbelow.

One aspect of the invention is to provide an information recording medium including at least one electrophotographic laminate film in which a surface resistance of at least one surface is in a range of $10^8$ to $10^{13}$ $\Omega/\square$, and on which a toner image corresponding to information is formed; and an opaque core base material laminated on a surface of the electrophotographic laminate film, on which surface the toner image is formed.

According to such an information recording medium, since the surface resistance of the electrophotographic laminate film is controlled for an electrophotograph and laminating usage, the transferability of a toner image to a substrate is excellent. Also, since the electrostatic adsorptive force of the substrate after the transfer step is small, the electrostatic adsorption to the core base material hardly takes place in the subsequent laminating step, and it is possible to align the laminating position efficiently and exactly. Moreover, it is also possible to process free from adhesion of dirt such as dusts, ensuring high quality finish.

Another aspect of the invention is to provide a method of producing an information recording medium. The method includes a latent image forming step of forming an electrostatic latent image corresponding to information on a surface of a latent image holding member; a developing step of developing the electrostatic latent image as a toner image; a transfer step of transferring the toner image to a transparent electrophotographic laminate film; and a laminating step of laminating a surface of the electrophotographic laminate film, on which surface the toner image is formed, with an opaque core base material. The surface resistance of at least one surface of the electrophotographic laminate film is in a range of $10^8$ to $10^{13}$ $\Omega/\square$.

According to this method, it is possible to produce an information recording medium which has the excellent features described above.

DETAILED DESCRIPTION OF THE INVENTION

The present invention will be hereinafter explained in detail.

An information recording medium according to the invention includes at least one electrophotographic laminate film in which a surface resistance of at least one surface is in a range of $10^8$ to $10^{13}$ $\Omega/\square$, and on which a toner image corresponding to information is formed; and an opaque core base material laminated on a surface of the electrophotographic laminate film, on which surface the toner image is formed.

The information recording medium of the invention and a method of producing the medium according to the invention will be hereinafter explained in detail with reference to the drawings.

Figure 1A:
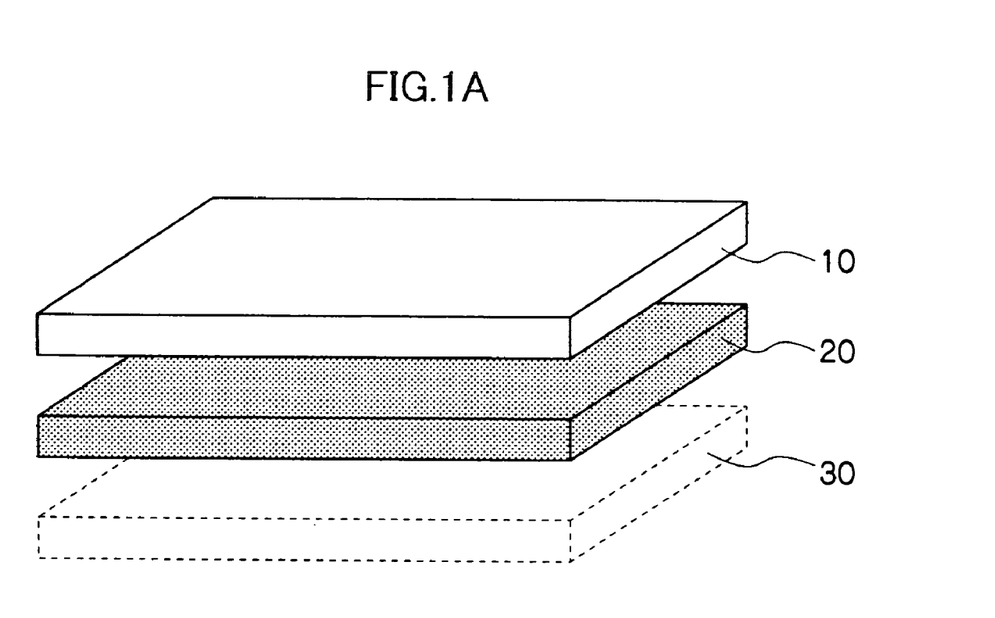
FIGS. 1A and 1B are schematic perspective views showing one example of the structure of an information recording medium according to the present invention.
Figure 1B:
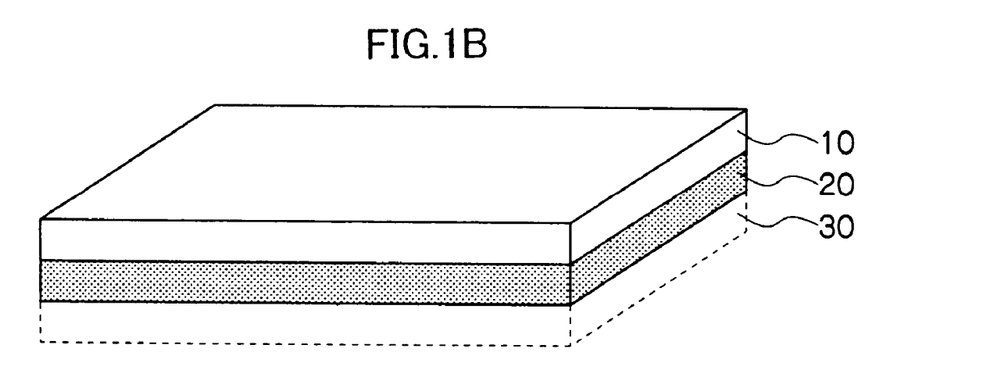

FIGS. 1A and 1B are schematic perspective views showing one example of the structure of the information recording medium of the invention. As shown in FIGS. 1A and 1B, the information recording medium of the invention is structured of an electrophotographic laminate film 10 (over sheet)

and a core base material 20 (core sheet) which is a body to be laminated. Also, the electrophotographic laminate film 10 is not limited to one film and, if necessary, may have a structure in which an electrophotographic laminate film 30 is further laminated on the core base material 20 on the side on which the electrophotographic laminate film 10 is not laminated. Further, sheets, layers and the like other than the above may be disposed if necessary.

The electrophotographic laminate film (hereinafter on occasions simply called "laminate film") in the invention must have a structure in which the surface resistance of at least one of the surfaces thereof is in a range of $10^8$ to $10^{13}$ $\Omega/\square$. Also, the surface resistance is preferably in a range of $10^9$ to $10^{11}$ $\Omega/\square$.

When the surface resistance is less than $10^8$ $\Omega/\square$, the electrostatic adsorptive force (adhesive force) of an electrophotographic laminate film 10 with another electrophotographic laminate film 10 or with a core base material 20 becomes small after an image is formed (to be explained later). However, the resistance of the electrophotographic laminate film as an image recording member at high temperature and high humidity becomes too low, and a transfer toner from the transfer material is sometimes disturbed, for example. On the other hand, when the surface resistance exceeds $10^{13}$ $\Omega/\square$, the aforementioned electrostatic adhesive force becomes too large and dirt is easily stuck to the film and handling becomes very difficult. Moreover, the resistance of the electrophotographic laminate film used as an image recording member becomes too high, with the result that, for example, the toner from the transfer material cannot be transferred to the surface of the film and image defects due to a transfer defect is sometimes caused.

The surface resistance may be measured under the circumstance of 23° C. and 55% RH using a circular electrode (for example, "HR Probe" of Highrester IP manufactured by Mitsubishi Chemical Co., Ltd.) according to JIS K6991.

In a case where only one surface of the aforementioned electrophotographic laminate film has a surface resistance in the above range, the surface is preferably the surface (laminate surface) on which an image is formed. The surface on which an image is formed is on occasions called "laminate surface" hereinafter.

Figure 2A:
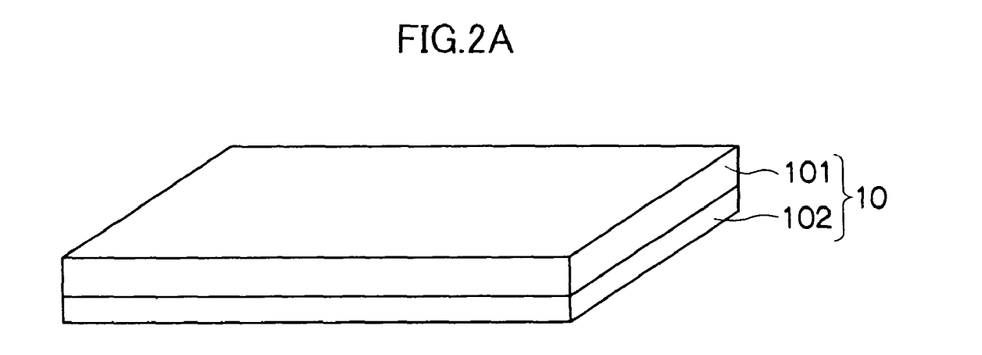
FIGS. 2A and 2B are schematic perspective views showing examples of the structure of an electrophotographic laminate film according to the invention.
Figure 2B:
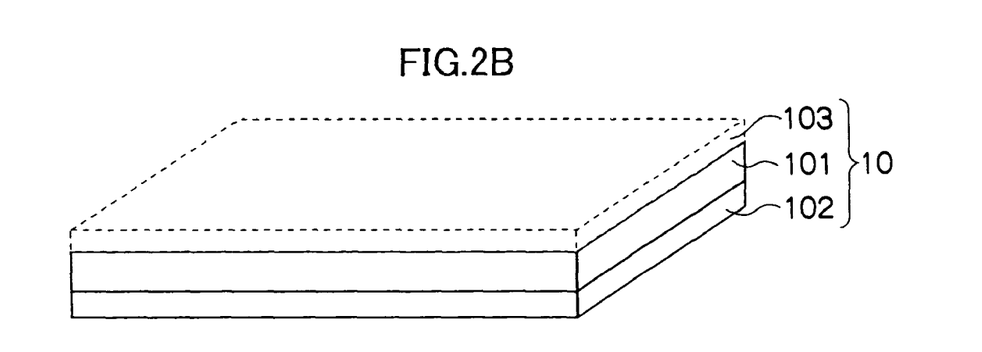

FIGS. 2A and 2B are schematic perspective views showing examples of the aforementioned electrophotographic laminate film.

In the electrophotographic laminate film 10 shown in FIG. 2A, a charge control layer 102 is disposed on the surface of a substrate 101. If necessary, the electrophotographic laminate film may have a structure which is further provided with a charge control layer 103 formed on the surface of the substrate 101 on the side on which the aforementioned charge control layer 102 is not formed as shown in FIG. 2B.

The charge control layer 102 may be formed on the surface of the substrate 101 as mentioned above. Alternatively, the surface resistance of the substrate 101 itself may be controlled by adding a conductive agent to the substrate 101 so that the surface resistance of at least one of the surfaces of the electrophotographic laminate film falls in the above range.

Also, the charge control layer 102 may be a functionality control means as will be explained later or may be a coating layer having a surface resistance in a particular range and a Vicat softening temperature in a particular range. When the coating layer is used, the coating layer is preferably formed on the side (laminate surface) on which a toner image is formed and laminated.

In the above information recording medium, the charge control layer 102 is disposed on at least one surface of the electrophotographic laminate film 10. Therefore, the transferability of a toner image is good and the electrostatic adhesion of the laminate film 10 with the laminate film 10 or with the core base material 20 is small. This ensures to easily and exactly accomplish the handling of the laminate film 10, for example, loosening of the sheets of the laminate film 10 and the alignment for lamination between the laminate film 10 and the core base material 20 after an image is formed. Moreover, when the charge control layer 102 is disposed on both surfaces of the substrate 101, the handling of the laminate film 10, for example, loosening of the sheets of the laminate film 10 and the alignment for lamination between the laminate film 10 and the core base material 20 after an image is formed can be accomplished more easily and more exactly. Furthermore, when the aforementioned coating layer is disposed on both sides of the laminate film 10, it is unnecessary to specify the surface on which an image is to be formed, which avoids misprint causing films to be wasted and makes it easy to handle the electrophotographic laminate film.

The substrate 101 usable for the electrophotographic laminate film in the invention preferably has transparency. Here, the transparency means the properties of transmitting, for example, light in the visible region to some extent. In the invention, it is only required for the substrate 101 to be transparent to the extent that at least, a formed image can be viewed with the eye from the surface opposite to the surface on which the image is formed, through the laminate film 10.

As the substrate 101, plastic films are typically used. Among these plastic films, light transmittable films usable as an OHP film such as a polyacetate film, cellulose triacetate film, nylon film, polyester film, polycarbonate film, polystyrene film, polyphenylene sulfide film, polypropylene film, polyimide film, cellophane and ABS (acrylonitrile-butadiene-styrene) resin film may be preferably used.

Among the aforementioned various plastic films, a polyester film, particularly, those called PETG obtained by replacing about one-half of an ethylene glycol component of PET (polyethylene terephthalate) with a 1,4-cyclohexanemethanol component, those alloyed by mixing polycarbonate with the aforementioned PET and amorphous type polyesters called A-PET which is not biaxially oriented are more preferably used.

The aforementioned materials such as polyesters can cope with such a situation where a polyvinyl chloride conventionally used as a core base material (core sheet) for a card is recognized as material which generates dioxins by burning when disposing of flammable substances and is therefore environmentally unacceptable one and comes to be not used. In the invention, as further materials taking it into account to use a core base material excluding the aforementioned chlorine, the aforementioned polystyrene type resin film, ABS resin film, AS (acrylonitril-styrene) resin film, a PET film and films obtained by adding a hotmelt type adhesive such as polyester and EVA to a polyolefin type resin film such as polyethylene and polypropylene are also preferably used.

The Vicat softening temperature of the substrate 101 used for the electrophotographic laminate film in the invention is in a range preferably of 70 to 130° C. and more preferably of 80 to 120° C.

When the Vicat softening temperature exceeds 130° C., the laminate film 10 may be neither stuck nor bonded to the core base material 20 sufficiently in a laminating step. On the other hand, when the Vicat softening temperature is less than 70° C., an image (image forming material) or a coating layer (to be explained later) may be excessively softened and therefore image defects (image flow) may take place even though the aforementioned sticking and bonding condition is satisfactory.

The aforementioned Vicat temperature is measured based on one method of evaluating the softening temperature of a thermoplastic resin. The measuring method is prescribed in JIS K7206, ASTM D1525 and ISO306 for a thermoplastic resin as a method of testing the heat resistance of a molded plastic material.

In the invention, using a test piece 2.5 mm in thickness, a needle-like indenter having a sectional area of 1 $mm^2$ is set to the surface of the test piece, a 1 kg load is put on this indenter and the temperature of an oil bath for heating the test piece is raised gradually. The temperature when the indenter is penetrated by 1 mm into the test piece is defined as the Vicat softening temperature.

There are several methods for controlling the surface resistance of the electrophotographic laminate film in a range of $10^8$ to $10^{13}$ $\Omega/\square$. A surfactant, a high-molecular conductive agent, a conductive microparticle and the like may be directly added to the resin when producing a film that becomes the substrate 101. Alternatively, as described above, as the charge control layer 102, a surfactant may be applied to the surface of the film, a metal thin film may be deposited on the surface of the film, or a surfactant and the like may be added to an adhesive, whereby the surface resistance can be controlled.

Examples usable as the surfactant include cationic surfactants such as polyamines, ammonium salts, sulfonium salts, phosphonium salts and betaine type amphoteric salts, anionic surfactants such as alkyl phosphates, and nonionic surfactants such as fatty acid esters. Among these surfactants, cationic surfactants having a large interaction with a negative charging type toner for electrophotography nowadays are effective to improve transferability.

Among the aforementioned cationic surfactants, quaternary ammonium salts are preferable. As the quaternary ammonium salts, a compound represented by the following formula (I) is preferable:

General formula (I)

In general formula (I), $R^1$ represents an alkyl group, an alkenyl group or an alkinyl group having 6 to 22 carbon atoms, and $R^2$ represents an alkyl group, an alkenyl group or an alkinyl group having 1 to 6 carbon atoms. $R^3$, $R^4$ and $R^5$, which may be the same or different, each independently represent an aliphatic group, an aromatic group or a heterocyclic group. The aliphatic group means a straight-chain, branched or cyclic alkyl group, alkenyl group or alkinyl group. The above aromatic group represents a benzene monocyclic ring or a condensed polycyclic aryl group. These groups may have a substituent such as hydroxyl group. A represents an amide bond, an ether bond, an ester bond or a phenyl group, but may not necessarily exist. X represents a halogen element, a sulfuric acid ion or a nitric acid ion wherein these ions may have a substituent.

As the substrate 101, other transparent resins and transparent ceramic may also be used besides the aforementioned plastic films; pigments or dyes may be added to these materials to color them. The substrate 101 may have a film-like or plate-like form or a shape having a thickness to the extent that it has no flexibility and has the strength required for the substrate 101.

The thickness of the substrate 101 is in a range preferably of 50 to 500 μm and more preferably of 75 to 150 μm. When the thickness is less than 50 μm, a transport defect may be caused when forming an image. On the other hand, when the thickness exceeds 500 μm, a transfer defect may be caused, leading to image deterioration.

A functionality control means as described below may be provided on the surface of the substrate 101. This functionality control means is preferably disposed on the substrate 101 on the side opposite to the laminate surface on which an image is to be formed and which is to be laminated.

The functionality control means preferably has at least one function selected from the functions of controlling glossiness, light resistance, antibacterial ability, anti-flammability, releasability and chargeability. Specifically, the functionality control means is disposed to add and/or to improve various functions such as glossiness, light resistance, antibacterial ability, anti-flammability, releasability and conductivity, and more preferably moisture resistance, heat resistance, water repellency, wear resistance and scratch resistance. This ensures that the electrophotographic laminate film in the invention can be resistant to various working conditions.

A functionality control means for controlling glossiness will be hereinafter explained as an example of a functionality control means, but the scope of a functionality control means should not be limited thereto.

Glossiness control is made so as to improve visibility as viewed from any angle by suppressing the "glare" of an image formed on the surface of the substrate 101. The functionality control means for controlling glossiness may be achieved with a glossiness control layer disposed on the surface of the substrate 101 or with a mechanical treatment for directly controlling glossiness on the surface of the substrate 101.

Examples of a method of performing mechanical treatment for directly controlling glossiness on the surface of the substrate 101 include a method of forming irregularities on the surface of the substrate 101 by a mechanical means. Light scattering takes place on the surface of the substrate once irregularities about 3 to 30 μm in depth are formed on the surface of the substrate 101. Desired glossiness treatment may be carried out by changing the size, roughness and depth of irregularities. As the aforementioned mechanical means, a sand blast method, embossing method, plasma etching method or other known mechanical surface treating methods may be used.

The sand blast method is a method in which the surface is roughened by using, as abrasive particles, amorphous or non-amorphous particles such as organic resins, ceramic and metals and blasting these particles towards the surface of a material. The embossing method is a method in which a die formed with irregularities is produced in advance and this die is brought into contact with a material to thereby transfer the irregularities of the die to the surface of the material. The plasma etching method is a method in which etching is carried out making use of excited molecules, radicals and ions generated as a result of molecular dissociation caused by plasma discharge. The etching progresses by vaporization of volatile compounds created by the reaction between the excited members produced and the material.

When the functionality control means for controlling glossiness is a glossiness control layer, the glossiness control layer may be formed by making use of the phase separation of a polymer. This is a method in which a resin incompatible with the resin forming the glossiness control layer is compounded in the resin and phase separation is caused during drying after the phase is formed, to thereby generate irregularities on the surface. The state of phase separation can be changed by controlling the type and amount of the incompatible resin, drying condition and the like. This ensures that the irregularities of the surface are controlled, with the result that the glossiness of the surface can be controlled.

Also, when the functionality control means for controlling glossiness is a glossiness control layer, the glossiness control layer may be structured of at least a binder and a filler. As the binder to be contained in the glossiness control layer, a resin may be used. With regard to the resin, the glossiness control layer is preferably structured of a heat-meltable resin used for an image forming material from the viewpoint of affinity to the substrate 101, the variety of material selection, stability, cost and easiness of production steps. The film thickness of the glossiness control layer is preferably in a range of 0.01 to 20 μm to stabilize the formation of a film and more preferably in a range of 0.1 to 5 μm to embrace the filler stably and to secure the adhesion to the substrate 101.

The electrophotographic laminate film in the invention may have a structure provided with one or more coating layers as an image receptor layer on the surface of the substrate 101 so that a good image is formed. As the resin for the coating layer, a heat meltable polyester resin is preferably used though various resins may be used.

The aforementioned polyester may be generally produced by reacting a polyvalent hydroxy compound with a polybasic carboxylic acid or its reactive acid derivative. Examples of the polyvalent hydroxy compound constituting the polyester include diols such as ethylene glycol, diethylene glycol, triethylene glycol, 1,2-propylene glycol, 1,3-propylene glycol, 1,4-butanediol and neopentyl glycol. As the polyester to be used in the invention, ethylene glycol and neopentyl glycol are particularly preferably used.

Also, examples of the aforementioned polybasic carboxylic acid include malonic acid, succinic acid, adipic acid, sebacic acid, alkyl succinic acid, maleic acid, fumaric acid, mesaconic acid, citraconic acid, itaconic acid, glutaconic acid, cyclohexanedicarboxylic acid, isophthalic acid, terephthalic acid and other divalent carboxylic acid. In the invention, isophthalic acid and terephthalic acid may be particularly preferably used from the productive point of view and in view of the availability of material and cost. Incidentally, phthalic acid have structural isomers, namely isophthalic acid and terephthalic acid and therefore the both are inevitably mixed in a ratio of about 50/50 when producing the polyester.

Particularly preferable formulation in the invention is as follows: the mol ratio of ethylene glycol to neopentyl glycol (ethylene glycol: neopentyl glycol) in the polyvalent hydroxy compound is preferably in a range of 3:7 to 1:9.

The number average molecular weight of the aforementioned polyester is in a range preferably of 12000 to 45000 and more preferably of 20000 to 30000. When the number average molecular weight is less than 12000, the softening temperature of a resin is too low and there is therefore the case where viscousness is developed even at normal temperature even if the mol ratio of ethylene glycol to neopentyl glycol is in a desired range. When the number average molecular weight exceeds 45000, the softening temperature becomes too high and the fixing ability of an image (toner) is therefore impaired.

Also, a toner compounded with wax (oilless toner) has recently started to be utilized in place of conventionally used toners coated with silicon oil to prevent a toner from winding around a fixing member. In the case of using such an oilless toner, a polyvinyl acetal is preferably contained in the aforementioned polyester resin to prevent the wax from being floated during fixing.

The reason why a polyvinylacetal resin is used as the resin for the coating layer is that it has high adhesion to a plastic film used as the substrate and high adhesion (compatibility) to the image forming material (oilless toner).

In the invention when a polyester resin and a polyvinylacetal resin are contained in the coating layer, the ratio (A/B) by mass of the mass (A) of a polyester resin to the mass (B) of a polyvinylacetal resin in the coating layer is in a range preferably of 90/10 to 20/80 and more preferably of 80/20 to 30/70.

When the mass A is large and the ratio (A/B) by mass exceeds 90/10, the content of the polyvinylacetal resin is too small and the polyvinylacetal resin may not be solved mutually with the wax in the toner for the image receptor layer. Also, when the mass B is large and the ratio (A/B) by mass is below 20/80, the transparency of the image receptor layer may decrease.

The coating layer preferably contains natural wax and synthetic wax which are materials less adhesive to a fixing member, a releasable resin or a releasable material such as a reactive silicone compound and modified silicone oil to prevent a toner from winding around the fixing member when fixing an image.

Specific examples of the wax include natural waxes such as carnauba wax, beeswax, montan wax, paraffin wax and microcrystalline wax and synthetic waxes such as low-molecular weight polyethylene waxes, low-molecular weight oxidation type polyethylene waxes, low-molecular weight polypropylene wax, low-molecular weight oxidation type polypropylene waxes, higher fatty acid wax, higher fatty acid ester wax and sazole wax. These waxes may be used not only singly but also by mixing them.

As the releasable resin, a silicone resin, fluororesin, or a modified silicone resin which is a modification of a silicone resin and various resins such as a polyester-modified silicone resin, urethane-modified silicone resin, acryl-modified silicone resin, polyimide-modified silicone resin, olefin-modified silicone resin, ether-modified silicone resin, alcohol-modified silicone resin, fluorine-modified silicone resin, amino-modified silicone resin, mercapto-modified silicone resin and carboxy-modified silicone resin, heat-curable silicone resin or photo-curable silicone resin may be added.

Because the aforementioned modified silicone resin has high affinity to a toner resin as an image forming material or to a resin particle composed of a heat-meltable resin according to the invention and therefore the both compounds are therefore appropriately mingled, solved mutually and melt-mixed, it provides superior color developing ability to pigments contained in a toner. At the same time, it is considered that the releasability of the silicone resin prevents a fixing member from sticking to the electrophotographic laminate film at the time of heat-melting.

Moreover, in the invention, a reactive silane compound and a modified silicone oil may be compounded to make the coating layer less adhesive. It has been found by the inventors that the reactive silane compound reacts with the coating layer resin and, at the same time, reacts with the modified silicone resin, whereby these compounds work as a releasing agent superior to the silicon oil used as a liquid lubricant, and also enters into a curing reaction whereby it is firmly fixed as a releasing agent to the inside of the coating layer, so that the releasing agent is not fallen down even by mechanical abrasion and solvent extraction.

Like the resin particle composed of the heat-meltable resin, these wax and releasable resin may be allowed to coexist in a particle state or the like. However, these materials are preferably added to the heat-meltable resin, dispersed and mutually solved in the resin, and utilized in the condition that these materials put in the above state are incorporated into the heat-meltable resin.

The coating layer to be used in the invention has a Vicat softening temperature ranging preferably from 70 to 130° C. and more preferably from 80 to 120° C. In the case where the aforementioned coating layer is disposed, the coating layer is the surface to be laminated (laminate surface). Therefore, like the substrate 101, the laminate film may be insufficiently stuck to and bonded with the core base material in the laminating step when the Vicat softening temperature exceeds 130° C. On the other hand, when the Vicat softening temperature is less than 70° C., an image (image forming material) or the coating layer is too softened and therefore image defects (image flow) may be caused even though the aforementioned stuck and bonded state is satisfactory.

In the selection of a rein for forming the coating layer, the selection is thus preferably made such that the Vicat softening temperature falls in the above range.

In the case of the electrophotographic laminate film provided with the coating layer on the surface thereof, it is also necessary that the surface resistance of at least one of the surfaces is in a range of $10^8$ to $10^{13}$ $\Omega/\square$ as described above. When the electrophotographic laminate film is provided with the coating layer, the surface resistance of the coating layer is in a range preferably of $10^8$ to $10^{13}$ $\Omega/\square$ and more preferably of $10^9$ to $10^{11}$ $\Omega/\square$. When the surface resistance is out of the above range, there may arise a problem of the same disorder as in the case of the aforementioned electrophotographic laminate film without a coating layer.

However, when the aforementioned charge control layer is disposed on the substrate 101 on the side opposite to the surface on which the coating layer is to be formed, the surface resistance of the coating layer may unnecessarily fall in the above range. Also, as described above, the coating layer is preferably formed on both surfaces of the substrate 101. In this case, although it is only required that the surface resistance of the coating layer on one surface is in the above range, each of the surface resistances of the coating layers on both surfaces is preferably in the above range.

The surface resistance of the coating layer can be made to fall in the above range by adding a high-molecular conductive agent, a surfactant and further a conductive metal oxide particle as charge control agents in the coating layer. Also, a matting agent is preferably added to improve transportability.

As the above surfactant, the same one as the surfactant, such as quaternary ammonium salts, which is to be added for surface processing with the view of controlling the surface resistance of the substrate 101 may be used.

Examples of the aforementioned conductive metal oxide particle may include ZnO, TiO, $TiO_2$, $SnO_2$, $Al_2O_3$, $In_2O_3$, SiO, $SiO_2$, MgO, BaO and $MoO_3$. These oxides may be used either independently or in combinations. Also as the metal oxide, those further containing hetero elements are preferable. For example, ZnO doped with Al, In or the like, TiO doped with Nb, Ta or the like and $SnO_2$ doped with Sb, Nb, a halogen atom or the like are preferable. Among these materials, $SnO_2$ doped with Sb is particularly preferable because it is less changed also in conductivity with time and is therefore highly stable.

Examples of the resin which is used for the aforementioned matting agent and has lubricity may include polyolefins such as polyethylene; and fluororesins such as polyvinyl fluoride, polyvinylidene fluoride and polytetrafluroethylene (Teflon (R)). Specific examples may include low-molecular weight polyolefin type wax (e.g., polyethylene type wax, molecular weight: 1000 to 5000), high-density polyethylene type wax and paraffin type or microcrystalline type wax.

Examples of the fluororesin may include a polytetrafluoroethylene (PTFE) dispersion solution.

The volume average particle diameter of the resin matting agent is in a range preferably of 0.1 to 10 μm and more preferably 1 to 5 μm. The volume average particle diameter is preferably larger. However, if it is too large, the matting agent is released from the coating layer, giving rise to a powder-falling phenomenon with the result that the surface of the coating layer tends to be abraded and damaged and further hazing (degree of haze) is increased.

Moreover, the content of the above matting agent is in a range preferably of 0.1 to 10% by mass and more preferably 0.5 to 5% by mass based on the aforementioned coating layer-forming resin.

The above matting agent preferably has a flat form, and a matting agent having a flat form originally may be used or using a matting agent having a relatively low softening temperature, it may be made to have a flat form when heating when the coating layer is applied and dried. Further, it may be flatted with pressing it under heating. However, it is desirable that the matting agent be projected convex-wise from the surface of the coating layer.

As the matting agent, besides the above agents, inorganic microparticles (e.g., $SiO_2$, $Al_2O_3$, talc or kaolin) and beads-like plastic powders (e.g., crosslinking type PMMA, polycarbonate, polyethylene terephthalate and polystyrene) may be used together.

As described above, it is necessary to decrease the friction of the surface of the laminate film by using a matting agent or the like in order to make better the transportability of the laminate film. The static friction coefficient of the surface of the laminate film is preferably 2 or less and more preferably 1 or less in view of actual use. The dynamic friction coefficient of the surface of the laminate film is in a range preferably of 0.2 to 1 and more preferably 0.3 to 0.65.

In the electrophotographic laminate film provided with the coating layer on its surface, at least the outermost coating layer preferably contains an antibacterial material corresponding to the purpose. The materials to be added are selected from those which have high dispersion stability in the composition and are not denatured by the application of light. Examples of such a material include materials such as thiocyanato compounds, rhodopropargyl derivatives, isothiazolinone derivatives, trihalomethylthio compounds, quaternary amminium salts, biguanide compounds, aldehydes, phenols, benzimidazole derivatives, pyridine oxide, carbanilide and diphenyl ether in the case of organic materials.

Also, examples of such a material include a zeolite type, silica gel type, glass type, calcium phosphate type, zirconium phosphate type, silicate type, titanium oxide and zinc oxide as inorganic materials.

The volume average particle diameter of the above inorganic type antibacterial agent is in a range preferably of 0.1 to 10 μm and more preferably of 0.3 to 5 μm. The antibacterial agent is preferably exposed from the surface of the aforementioned coating layer basically. Accordingly, the volume average particle diameter is selected corresponding to the film thickness of the coating layer. If the volume average particle diameter is too large, the antibacterial agent is released from the coating layer, giving rise to a powder-falling phenomenon with the result that the surface of the film tends to be abraded and damaged and further hazing (degree of haze) is increased.

Moreover, the content of the antibacterial agent in the coating layer is in a range preferably of 0.05 to 5% by mass and more preferably 0.1 to 3% by mass based on the aforementioned coating layer-forming resin.

In addition, various additives for plastics such as a heat stabilizer, oxidation stabilizer, photostabilizer, lubricant, pigments, plasticizer, crosslinking agent, impact resistance improver, disinfectant, flame retardant, flame retardant adjuvant and antistatic agent may be used together if necessary in the coating layer used as an image receptor layer.

The aforementioned charge control layer 102 and coating layer constituted of at least a resin and a filler are formed on the surface of the substrate 101 by the following methods.

The aforementioned each layer may be formed in the following manner: at least a resin and a filler are mixed by using an organic solvent, water or the like, these components are evenly dispersed by using ultrasonic or device such as a wave rotor, attritor or sand mill to prepare a coating solution and then the surface of the substrate 101 is coated or impregnated with the coating solution put in this state.

Examples of a coating or impregnating method include usually adopted methods such as a blade coating method, wire bar coating method, spray coating method, dip coating method, beads coating method, air knife coating method, curtain coating method and roll coating method.

As to the above coating, in the case where the electrophotographic laminate film is provided with both the charge control layer and the coating layer or provided with the coating layer on both surfaces thereof, any one of them may be first applied or the both layers may be applied simultaneously.

In the production of the coating solution, it is preferable to use a good solvent which dissolves the surface of the substrate 101 as a solvent. The use of such a solvent outstandingly strengthens the linkage between the substrate 101 and the coating layer. This reason is that when a poor solvent is used, the adhesion between the electrophotographic laminate film 10 and the core base material 20 after laminated is insufficient because a clear boundary is present between the coating layer and the substrate 101 whereas when a good solvent is used, the aforementioned clear boundary is not present and therefore the surface of the substrate 101 is united with the coating layer, with the result that the aforementioned adhesion is sufficiently improved.

Here, the term "good solvent" for the substrate 101 means that the solvent has a solubility more than such a level that the surface of the substrate 101 is eroded a little (a haze and the like is observed slightly on the surface after the solvent is removed) due to its some action exerted on the substrate 101 when the solvent is brought into contact with the surface of the substrate 101.

Although the drying when forming the coating layer on the surface of the substrate 101 may be air-drying, the coating layer can be easily dried by heat drying. Examples of a drying method include usually adopted methods such as a method of drying in an oven, a method of drying by passing the substrate 101 through an oven and a method of bringing the substrate 101 into contact with a heat roller. Also, the aforementioned charge control layer 102 is also formed by the same method.

Each film thickness of layers as functionality control means such as the charge control layer 102 to be formed on the surface of the substrate 101 in this manner is in a range preferably of 0.1 to 20 μm and more preferably of 1.0 to 10 μm.

Also, the film thickness of the coating layer is likewise in a range preferably of 0.1 to 20 μm and more preferably 1.0 to 10 μm.

Next, the following description will discuss a method of forming an image by an electrophotographic system on a non-printed laminate film provided with the charge control layer and the coating layer serving as an image receptor layer which layers are formed in the above methods.

In the formation of an image on a non-printed laminate film by an electrophotographic system, a charge is applied uniformly to the surface of an electrophotographic photoreceptor (latent image holding member) to electrify the photoreceptor and the surface is exposed in accordance with image information (information) to form an electrostatic latent image corresponding to the exposure (latent image-forming step). Next, a toner, which is an image forming material, is supplied to the surface of the photoreceptor from a developing unit whereby the electrostatic latent image is visually developed by the toner (a toner image is formed: developing step). Further, the formed toner image is transferred to the surface (laminate surface) of the non-printed laminate film on which the image receptor layer (coating layer) has been formed (transfer step) and finally, the toner is fixed to the surface of the image receptor layer by heat, pressure and the like (fixing step) to complete an image recording member. The image recording member corresponds to the electrophotographic laminate film in the present invention.

In the invention, the electrophotographic laminate film on which a toner image is formed is produced through the aforementioned latent image-forming step, developing step and transfer step as essential steps, and using, if necessary, the aforementioned fixing step. In the case where the process of producing the electrophotographic laminate film on which a toner image is formed involves no fixing step, a system in which laminating and fixing are carried out simultaneously in a laminating step which will be mentioned later may be adopted, whereby simplification of process steps and energy savings can be accomplished.

As described above, the toner image transferred to the laminate surface of the laminate film is formed according to the information to which the electrophotographic photoreceptor is exposed. This information may be either image information or character information and the like.

Also, the above information may be variable information. Specifically, the toner images formed on the surface of the non-printed laminate film in the aforementioned image formation may not be the same but different toner images corresponding to information which is variable every sheet in the formation of each image on plural sheets.

Furthermore, the aforementioned image may be personal information. The information recording medium of the invention may be applied to a cash card, employee identification card, student identification card, individual membership card, residence certificate, various driver's licenses, various qualification acquisitive certificates and the like. When the information recording medium is used in these applications, the aforementioned information is primarily personal information such as a photograph of the face, personal identification image information, name, residence and date of one's birth.

In the electrophotographic laminate film in the invention, the laminate surface is used as an image forming surface and the image on the image receptor layer disposed on the surface of the unprinted laminate film must be formed as a reverse image (mirror image). When forming an electrostatic latent image on the surface of the electrophotographic photoreceptor, it is preferable that the information of a mirror image be provided as image information to which the surface of the photoreceptor is exposed.

The toner mass TMA per unit area on the surface of the laminate film 10 is in a range preferably of 0 to 0.7 mg/cm$^2$ in the case of a black image corresponding to character information and preferably from 0 to 2.1 mg/cm$^2$ in the case of a full-color image.

The toner used in the invention is not particularly limited by a production method. Examples of production method of a toner include a kneading and crushing method in which, for example, a binder resin, a colorant, a releasing agent and, if necessary, a charge control agent and the like are kneaded, crushed and classified; a method in which the shape of the particle obtained by the kneading and crushing method is changed by mechanical impact force or heat energy; an emulsion-polymerization-coagulation method in which a polymerizable monomer contained in a binder resin is emulsion-polymerized and the formed dispersion solution is mixed with a dispersion solution of a colorant, a releasing agent and, if necessary, a charge control agent and the like, followed by coagulating and fusing under heating to obtain a toner particle; a suspension-polymerization method in which a solution containing, for example, a polymerizable monomer used to obtain a binder resin, a releasing agent and, if necessary, a charge control agent is suspended in an aqueous solvent to polymerize; and a dissolution-suspension method in which a solution containing a binder resin, a colorant, a releasing agent and, if necessary, a charge control agent is suspended in an aqueous solvent to granulate. Also, known methods such as a production method in which the toner obtained by the above methods is used as a core and further, coagulated particles are stuck to the core, which is then fused under heating to make the toner have a core-shell structure may be used. A suspension polymerization method, emulsion polymerization method and dissolution suspension method using an aqueous solvent to produce a toner are preferable and an emulsion polymerization coagulating method is particularly preferable from the viewpoint of shape control and particle distribution control.

The toner comprises a binder resin, a colorant, a releasing agent and the like and may use silica and a charge control agent if necessary. The volume average particle diameter of the toner is in a range preferably of 2 to 12 μm and more preferably of 3 to 9 μm. The use of a toner having an average shape index (ML$^2$/A: ML represents the absolute maximum length of a toner particle and A represents the projection area of a toner particle) ranging from 115 to 140 makes it possible to obtain a high quality image having high developing and transfer characteristics.

Also, the softening temperature of the toner is in a range preferably of 60 to 150° C. and more preferably 90 to 120° C.

A toner is fixed to the surface of an image receptor layer by applying heat and pressure simultaneously. During the fixing process, the toner is brought into contact with a fixing member. Therefore, when, for example, the toner has high affinity to the fixing member, a part of the toner is transferred to the fixing member and remains on the fixing member as an offset, which causes the deterioration of the fixing member with the result that the life of the fixing unit is shortened. Therefore, when the electrophotographic laminate film is used as an image recording member, it is necessary to obtain sufficient fixing ability of a toner image and peelability from the fixing member.

However, each surface of the image receptor layer (coating layer) and substrate 101 which are used in the invention is highly adhesive to a toner, the toner is sufficiently fixed to the surface of the laminate film at a temperature lower than the temperature at which the toner is melted into a viscous state. If the fixing temperature is raised more than required to a temperature exceeding this melt temperature, the temperature far exceeds the Vicat softening temperature of the substrate 101. As a result, on occasions the substrate 101 can shrink, resulting in wrinkles, deform to a large degree, and thus become unusable, and sometimes wind around the fixing member, with the result that the life of the fixing unit may be shortened.

For this, in the invention, the fixing of the toner image formed on the surface of the electrophotographic laminate film is preferably carried out in such a manner that the temperature of the surface of the electrophotographic laminate film is made to be lower than the melt temperature of the toner. Taking the melt temperature of a usual toner into account, the fixing is carried out in the condition that the surface temperature of the electrophotographic laminate film is preferably 130° C. or less and more preferably 110° C. or less.

Even in the case of the toner is fixed in the condition that the temperature of the surface of the laminate film is 130° C. or less as described above, the temperature of the surface of the laminate film when fixed is preferably lower than the Vicat softening temperature of the substrate 101 because of the above reason and further, the surface temperature of the laminate film when fixed may be almost equal to the softening temperature of the toner.

Here, when the aforementioned fixing step is not provided and when the surface temperature of the laminate film is lower than the softening temperature of the toner even if the fixing step is provided, the toner resin is in an unfixed state on the surface of the laminate film 10. Depending on the process up to laminating the laminate film 10 on the core base material 20, a sheet of the laminate film 10 may be rubbed with another sheet of the laminate film 10 or with the core base material 20. Also, a toner image may be touched with fingers, and the toner image may be shifted or dropped. As described above, there is a method in which the fixing step is omitted and the laminating step serves as a fixing step. However, for the above reason, the fixing step is preferably performed and the surface temperature of the laminate film when fixed is preferably almost equal to or more than the softening temperature of the toner.

Even in the case of performing the fixing in the above condition, the temperature sometimes falls in a range where thermal deformation takes place depending on the type of substrate 101. In this case, particularly the stiffness of the laminate film 10 is low and therefore the laminate film tends to wind around a heating roll of a fixing device. In such a case, it is desirable to overlap paper or the like on the laminate film when transporting the laminate film. It is would be also desirable to supplement the stiffness of the laminate film in the fixing device and to modify/adjust the fixing device so that a guide is in contact with the edge part of a film.

In the meantime, the electrophotographic laminate film according to the invention is in contact with the fixing member also in the non-image portion when fixed and it is therefore required for the laminate film to have the same qualities including releasability as the toner.

In the invention, as described above, an image receptor layer (coating layer) containing at least a heat meltable polyester resin is preferably formed on one surface of the substrate 101. Also, a heat meltable resin or a heat-curable resin, photo-curable resin or electron ray-curable resin is preferably compounded and a releasing agent is preferably compounded as an additive, whereby it is possible to prevent the adhesion of the laminate film to the fixing member in the fixing step. In addition, the addition of a charge control agent ensures that not only the transfer performance can be maintained in an electrophotographic system but also discharge paper tray receiving capability and piled film-loosening performance and further, accuracy in alignment with the core base material for lamination in the next step can be improved.

Next, explanations will be furnished as to a laminating step of laminating the laminate surface of the electrophotographic laminate film provided with a toner image on the opaque core base material.

As the core base material 20 used in the invention, a whitened plastic film is typically used because the core base material 20 is preferably opaque so as to easily see an image formed on the laminate film used as an information recording medium.

As the resin for the core base material, the same materials that are used for the substrate 101 of the laminate film may be used and, for example, a polyacetate film, cellulose triacetate film, nylon film, polyester film, polycarbonate film, polystyrene film, polyphenylene sulfide film, polypropylene film, polyimide film, cellophane or ABS (acrylonitrile-butadiene-styrene) resin film may be preferably used.

Among the above films, a polyester film, particularly those called PETG obtained by replacing about one-half of an ethylene glycol component of PET (polyethylene terephthalate) with a 1,4-cyclohexanemethanol component, those alloyed by mixing polycarbonate with the aforementioned PET and amorphous type polyesters called A-PET which is not biaxially oriented are more preferably used.

In the invention, as further materials, the aforementioned polystyrene type resin films, ABS resin films and AS (acrylonitrile-styrene) resin films and films obtained by adding a hotmelt type adhesive such as polyester and EVA to a PET film or polyolefin type resin films such as polyethylene and polypropylene may be preferably used taking the use of a base material containing no chlorine into account as described above.

As a method of whitening plastics, a method may be used in which white pigments, for example, metal oxide microparticles such as silicon oxide, titanium oxide and calcium oxide, organic white pigments and polymer particles are mixed in a film. Also, the surface of a plastic film may be subjected to sand blast treatment and embossing processing to form irregularities on the surface of the plastic film whereby the plastic film can be whitened by light scattering due to these irregularities.

The Vicat softening temperature of the core base material 20 in the invention is in a range preferably of 70 to 130° C. and more preferably of 80 to 120° C.

When the Vicat softening temperature exceeds 130° C., the core base material 20 (core sheet) may be insufficiently stuck to and bonded with the electrophotographic laminate film 10 (over sheet) in the laminating step. On the other hand, when the Vicat softening temperature is less than 70° C., the core base material 20 may be too softened though the aforementioned stuck and bonded state may be satisfactory. In this case, curling, waving, deformations caused by flow of the softened resin, and image strain may take place in making an information recording medium.

As the core base material 20 used in the invention, it is preferable to use a film composed of a plastic having a thickness ranging from 50 to 5000 µm and it is more preferable to use a PETG film having a thickness ranging from 100 to 1000 µm.

In the invention, when the information recording medium is used as an IC card or the like, the core base material 20 may contain a semiconductor circuit inside or on its surface.

As a method of incorporating a built-in semiconductor circuit in the core base material 20, a method is preferably used in general in which a sheet, called an inlet, to which the aforementioned semiconductor circuit is fixed is sandwiched between sheet materials constituting the core base material 20 and thermally fused to integrate it with these sheet materials by a heat press. Also, a method may be adopted in which a semiconductor circuit is directly arranged without using the above inlet sheet and then thermally fused to integrate in the same manner as above.

Other than the above, sheets constituting the core base material 20 are applied to each other by using an adhesive such as a hot melt to incorporate a built-in semiconductor circuit in the same manner as above. However, the method of incorporating a built-in semiconductor circuit is not limited to these methods and, for example, any method may be applied as the method of producing the core base material 20 as far as it is a method of incorporating a semiconductor circuit into an IC card.

Moreover, a semiconductor circuit may be arranged not inside of the core base material 20 but in the state that it is exposed from the surface as far as there is no problem as to use as an information recording medium.

In the case where a plastic sheet is used not only as an IC card but also as a magnetic card, an antenna, a magnetic stripe, an external terminal and the like are embedded in the core sheet if necessary. There is also the case where a magnetic stripe, a hologram and the like are printed and necessary character information is embossed.

The information recording medium of the invention is produced by overlapping the electrophotographic laminate film provided with a toner image on the opaque core base material such that the laminate surface faces the core base material and by laminating the both on each other in the laminating step.

The operation of overlapping the electrophotographic laminate film 10 on the core base material 20 may be carried out by arranging the both by holding with hands. Alternatively, it may be carried out by discharging the laminate film 10 and the core base material 20 one by one to a gathering tray or the like provided after the image forming to properly arrange the both automatically.

The pressure-laminating method is not particularly limited. Conventionally known various laminating techniques and laminators may be preferably adopted. In the invention, a heat press method for laminating the laminate film and the core base material by applying heat is preferably used. Examples thereof include a usual technique and a usual laminator in which a laminate composed of the laminate film 10 and the core base material 20 is forcedly passed through a nip portion of a pair of heat rolls or the like to allow the both to be thermally melted and thermally fused to some extent, whereby the both can be laminated on each other under pressure.

When the laminate film 10 (unfixed laminate film) on which a toner image is formed without performing the aforementioned fixing step is used in the laminating step, the color developing ability and the like of the toner can be secured by making the aforementioned laminating temperature slightly higher than in the case of using the laminate film 10 which has been processed in the fixing step.

The laminate that has been laminated may be the information recording medium of the invention as it is. Here, when plural individual images are formed on the electrophotographic laminate film, the film is cut every image to obtain plural information recording media each having a predetermined size.

The embodiments of the invention will be explained hereinbelow.

A first embodiment of the invention provides an information recording medium comprising: at least one electrophotographic laminate film in which a surface resistance of at least one surface is in a range of $10^8$ to $10^{13}$ $\Omega/\square$, and on which a toner image corresponding to information is formed; and an opaque core base material laminated on a surface of the electrophotographic laminate film, on which surface the toner image is formed.

A second embodiment of the invention provides the information recording medium of the first embodiment, wherein a Vicat softening temperature of a substrate in the electrophotographic laminate film is in a range of 70 to 130° C.

According to such an information recording medium, the electrophotographic laminate film is softened at relatively low temperatures and is therefore fused with the core base material in the above laminating step, and it is possible to attain the laminate strength which has no practical problem as the strength of an information recording medium.

A third embodiment of the invention provides the information recording medium of the first embodiment, wherein the information is variable information.

A fourth embodiment of the invention provides the information recording medium of the third embodiment, wherein the variable information is personal information.

According to the information recording media described in the third and fourth embodiments, an information recording medium corresponding to multi-kind and multi-lot and an information recording medium corresponding to personal identifications can be attained.

A fifth embodiment of the invention provides the information recording medium of the first embodiment, wherein a Vicat softening temperature of the core base material is in a range of 70 to 130° C.

According to this information recording medium, the electrophotographic laminate film is softened at relatively low temperatures and also the core base material is softened at relatively low temperatures in the laminating step. Therefore, the electrophotographic laminate film is surely fused with the core base material, whereby the laminating strength has no practical problem as an information recording medium.

A sixth embodiment of the invention provides the information recording medium of the first embodiment, wherein the core base material is provided with a semiconductor circuit inside the core base material or on a surface thereof.

According to this information recording medium, electric information can be read and written by using a reader and writer of the information recording medium.

A seventh embodiment of the invention provides the information recording medium of the first embodiment, wherein the substrate and/or the core base material in the electrophotographic laminate film contains a non-chlorine resin as its major component thereof.

According to this information recording medium, it generates no dioxin when incinerating the information recording medium and it is therefore possible to obtain an information recording medium safe to the environment.

An eighth embodiment of the invention provides the information recording medium of the first embodiment, further comprising at least one coating layer disposed on a surface of a substrate in the electrophotographic laminate film, on which surface the toner image is formed, wherein the coating layer has a surface resistance in a range of $10^8$ to $10^{13}$ $\Omega/\square$ and a Vicat softening temperature in a range of 70 to 130° C.

According to this information recording medium, a functionality-providing layer (coating layer) is disposed on the laminate side, making it easy to control the surface resistance and softening temperature of the electrophotographic laminate film, whereby the same effect as those described in the first and second embodiments can be attained in this structure.

A ninth embodiment of the invention provides a method of producing an information recording medium, the method comprising a latent image forming step of forming an electrostatic latent image corresponding to information on a surface of a latent image holding member; a developing step of developing the electrostatic latent image as a toner image; a transfer step of transferring the toner image to a transparent electrophotographic laminate film; and a laminating step of laminating a surface of the electrophotographic laminate film, on which surface the toner image is formed, with an opaque core base material, wherein a surface resistance of at least one surface of the electrophotographic laminate film is in a range of $10^8$ to $10^{13}$ $\Omega/\square$.

A tenth embodiment of the invention provides the method of the ninth embodiment, wherein a Vicat softening temperature of a substrate in the electrophotographic laminate film is in a range of 70 to 130° C.

An eleventh embodiment of the invention provides the method of the ninth embodiment, wherein a Vicat softening temperature of the core base material is in a range of 70 to 130° C.

According to the method of producing an information recording medium in the tenth and eleventh embodiments, the transferability of a toner image to the electrophotographic laminate film is excellent. Also, since the electrostatic adsorptive force of the electrophotographic laminate film after the transfer step is small, the electrostatic adsorption to the core base material hardly takes place in the subsequent laminating step, and it is possible to align the laminating position efficiently and exactly. Moreover, it is also possible to process free from adhesion of dirt such as dusts, ensuring high quality finish. The electrophotographic laminate film is softened at relatively low temperatures and the core base material is softened at relatively low temperatures in the laminating step. Therefore, the electrophotographic laminate film is surely fused with the core base material, whereby the laminating strength of the information recording medium has no practical problem.

A twelfth embodiment of the invention provides the method of the ninth embodiment, the method further comprising a fixing step of fixing the transferred toner image on the surface of the electrophotographic laminate film between the transfer step and the laminating step.

According to this method of producing an information recording medium, in addition to the above effects, the effect of preventing a toner image from shifting and falling down during the course until the laminate film is laminated on the core base material is obtained since the fixing step is provided after the toner image is transferred to the electrophotographic laminate film, ensuring the production of a higher quality information recording medium.

EXAMPLES

The present invention will be hereinafter explained in detail by way of examples. However, the scope of the invention should not be construed to be limited thereto. All "parts" in examples and comparative examples indicate parts by mass.

Example 1

An electrophotographic laminate film (laminate film 1) according to the invention is produced. A method of producing the laminate film 1 will be hereinafter explained step by step.

<Production of a Substrate and an Electrophotographic Laminate Film>

10 parts of a transparent high-molecular conductive agent (Irgastat P-22, manufactured by Ciba Specialty Chemicals Inc.) is mixed with 90 parts of a PETG resin (Eastar PETG 6763, manufactured by Eastman Chemicals, Vicat softening temperature: 85° C.). This mixture is melted and kneaded at 240° C. by using a biaxial extruder with a vent. The kneaded mixture is extruded in a molten film state downward from a die and brought into contact with the outer periphery of a cooling mandrel disposed on the same line as the die to cool it to 80° C., so as to obtain a substrate 1 which is a transparent film having a thickness of 100 μm. This substrate 1 has a surface resistance of $2.8 \times 10^{10}$ Ω/□ and a Vicat temperature of 78° C. This substrate 1 is cut into an A4-size to produce a laminate film 1.

<Production of a Card (Information Recording Medium)>

A color mirror image including a solid image is printed on the surface of the laminate film 1 (non image formed) by using a modification of a color copier DocuColor 1250 (one modified such that the surface temperature of a laminate film falls in a range of 95 to 100° C., manufactured by Fuji Xerox Co., Ltd.) to produce a laminate film 1 on which the mirror image is formed.

An A4 size white sheet (Diacrel W2012, manufactured by Mitsubishi Plastics Inc., thickness: 500 μm, Vicat softening point: 85° C.) in which the surface material is PETG and the inside material is A-PET is used as a core base material 1. The laminate film 1 is overlapped on each of the front side and backside of the core base material 1 so that the four corners of each film accord to the corresponding four corners of the core base material 1. Here, the core base material is disposed on the surface on which an image is formed (laminate surface).

The laminate (laminate film 1/core base material 1/laminate film 1) obtained by the above aligning and overlapping steps is subjected for lamination. A laminator (Lamipacker LPD3206 City, manufactured by Fujipla Inc.) is used under the condition of 160° C. and a feed rate of 0.3 m/min (5 mm/sec) so as to obtain a card 1.

<Evaluation of the Performance of the Electrophotographic Laminate Film and Card>

In each step of the production of the card 1, the discharge paper tray receiving capability, image quality, loosening characteristics, operability in the alignment with the core base material 1 for lamination, laminate quality (resistance to incorporation of dusts) and laminating characteristics (peeling strength) of the laminate film 1 are each evaluated according to the following criteria to confirm the performance as an electrophotographic laminate film and the performance as a card (an information recording medium).

Evaluation of Discharge Tray Receiving Capability

The discharge tray receiving capability of the laminate film 1 in the color copier is evaluated as follows. 30 sheets of laminate film 1 are set to the hand feeding tray of the modified color copier DocuColor 1250, and then the mirror image is formed on the 30 sheets of laminate film 1 by printing continuously. The condition of 30 sheets of laminate film 1 piled and received in the discharge paper tray is evaluated.

The criteria of evaluation are as follows.

⊚: Piled up as usual. None of the sheets get stuck and sheets piled up almost without any shifting.

○: Piled up as usual. None of the sheets get stuck and sheets piled up with only a little shifting.

Δ: Sheets piled up while the rear end of one or more laminate films get caught at the exit of the color copier.

X: Sheets get stuck, resulting in the occurrence of jam (jam of films).

Evaluation of Image Quality (Transferability)

The image quality (transferability) is evaluated by the printing accuracy (print reproducibility) of characters on the laminate film 1. An image is printed on the laminate film 1 under three conditions: high temperature and high humidity condition (28° C., 85% RH: condition A), ambient temperature condition (22° C., 55% RH: condition B), and low temperature and low humidity condition (10° C., 15% RH: condition C).

The criteria of evaluation are as follows.

○: No problem under any one of conditions.

X: Problem arises under one of the conditions (examples: AX, C X, etc.).

Evaluation of Loosening Characteristics

The loosening characteristics of the laminate film 1 after the laminate film 1 is received in the discharge tray in the color copier are evaluated in the following manner. A hook is adhered to one of piled sheets of laminate film 1 with an adhesive tape and a spring balance is hung on the hook. The maximum electrostatic adsorptive force (adhesive force) between the sheets of laminate film 1 is measured when one sheet of laminate film 1 is slid by hand in a direction horizontal to the surface of the laminate film at a rate of about 100 mm/sec. The maximum electrostatic adsorptive force is measured five times and an average (N) of these is subjected to evaluation.

The criteria of evaluation are as follows.

⊚: The electrostatic adsorptive force between the sheets of laminate film 1 is 0.49 N or less and the laminate films are loosened among them without resistance.

○: The electrostatic adsorptive force between the sheets of laminate film 1 is more than 0.49 N and 1.47 N or less. The sheets of laminate film are loosened among them with ease.

Δ: The electrostatic adsorptive force between the sheets of laminate film 1 is more than 1.47 N and 4.9 N or less. The laminate films are loosened among them with difficulty.

X: The electrostatic adsorptive force between the sheets of laminate film 1 exceeds 4.9 N. The laminate films are not loosened among them easily.

Evaluation of Operability in the Alignment for Lamination

The operability in the alignment for lamination is evaluated based on the difficulty of aligning the laminate film 1 on the core base material 1 when the core base material 1 is to be overlapped on the image surface side of the laminate film 1 before lamination.

The criteria of evaluation are as follows.

⊚: Four corners can be aligned without resistance by an operation of lightly holding both sides of the three films by hands and aligning the bottom part once or twice.

○: Four corners can be aligned with ease by an operation of aligning the bottom part four or five times.

Δ: Four corners can not be aligned without arranging the left and light corners one by one with hands such that each corner is aligned and then stretching the whole wrinkles.

X: The cases other than the above. It is difficult even to shift the films among them and the four corners can not be aligned easily.

Laminate Quality (Resistance to Incorporation of Dusts)

With regard to the laminate quality, the level of dusts incorporated between the laminate film 1 and the core material 1 in the card after the above laminating step is evaluated visually according to the following criteria.

○: Incorporation of dusts is not observed.

Δ: Incorporation of dusts is observed in a small amount.

X: Incorporation of dusts is observed in a large amount.

Evaluation of Laminating Characteristics (Peeling Strength)

The laminating characteristics are evaluated as follows. The substrate 1 and the laminate film 1 are partially separated at the boundary between them by using a cutter knife in the card 1 after the above laminating step. The both sides of the separated portion are held by hands and the substrate 1 and the laminate film 1 are tried to be peeled from each other. Then, the peeled state is evaluated according to the following criteria.

⊚: The substrate 1 is not peeled off at all.

○: Though peeled off partially, the laminated film 1 is torn off.

Δ: Although the laminate film 1 is peeled off, the image on the peeled surface is disarranged. It is thus thought that forging with the peeled laminate film 1 is difficult.

X: The cases other than the above. The laminate film 1 is easily peeled off.

Evaluation of Laminate Image Quality (Slippage of a Toner Image)

With regard to the laminate image quality, the level of slippage of an image in the card 1 after the above laminating step is evaluated visually according to the following criteria.

○: Slippage of an image can not be confirmed visually.

Δ: Slippage of an image can be observed only slightly.

X: The lack of an image is observed.

The above results are shown in Table 1.

Example 2

A substrate 2 is obtained in the same manner as in Example 1 except that 18 parts of a transparent high-molecular conductive agent (Irgastat P-18, manufactured by Ciba Specialty Chemicals Inc.) and 82 parts of a PETG resin (Eastar PETG 6763, manufactured by Eastman Chemicals, Vicat softening temperature: 85° C.) are used as the substrate material. This substrate 2 has a surface resistance of $8.5 \times 10^{12}$ Ω/☐ and a Vicat temperature of 75° C. This substrate 2 is cut into an A4-size to produce a laminate film 2.

Next, a card 2 is produced in the same manner as in Example 1 except that the laminate film 2 is used in place of the laminate film 1. As to each step during the course of the process, evaluation of the laminate film 2 and the card 2 is made in the same manner as in Example 1.

The results are shown in Table 1.

Example 3

A substrate 3 is obtained in the same manner as in Example 1 except that 7 parts of a transparent high-molecular conductive agent (Irgastat P-18, manufactured by Ciba Specialty Chemicals Inc.), 3 parts of a surfactant (Elegan 264 WAX, manufactured by Nippon Oil and Fats), and 90 parts of an alloy resin of PETG and polycarbonate (Eastalloy DA003, manufactured by Eastman Chemicals, Vicat softening temperature: 118° C.) are used as the substrate material. This substrate 3 has a surface resistance of $5.8 \times 10^{9}$ Ω/☐ and a Vicat temperature of 107° C. This substrate 3 is cut into an A4-size to produce a laminate film 3.

Next, a card 3 is produced in the same manner as in Example 1 except that the laminate film 3 is used in place of the laminate film 1. As to each step during the course of the process, evaluation of the laminate film 3 and the card 3 is made in the same manner as in Example 1.

The results are shown in Table 1.

Comparative Example 1

A substrate 4 is obtained in the same manner as in Example 1 except that 12.5 parts of a transparent high-molecular conductive agent (Irgastat P-18, manufactured by Ciba Specialty Chemicals Inc.) and 87.5 parts of a PETG resin (Eastar PETG 6763, manufactured by Eastman Chemicals, Vicat softening temperature: 85° C.) are used as the substrate material. This substrate 4 has a surface resistance of $1.0 \times 10^{14}$ Ω/☐ and a Vicat temperature of 80° C. This substrate 4 is cut into an A4-size to produce a laminate film 4.

Next, a card 4 is produced in the same manner as in Example 1 except that the laminate film 4 is used in place of the laminate film 1. As to each step during the course of the process, evaluation of the laminate film 4 and the card 4 is made in the same manner as in Example 1.

The laminate film 4 is poor in image quality (transferability) and image density is reduced. It causes a lack of characters, and has a deteriorated image quality in low-temperature and low-humidity condition. Due to its very large electrostatic adsorptive force, the laminate film 4 is inferior in all of the discharge paper tray receiving ability, the loosening characteristics and laminating workability. Consequently, the laminate quality is also poor since many dusts are adsorbed and mingled in the laminate surface.

The results of evaluation are shown in Table 1.

Comparative Example 2

<Preparation of a Coating Solution B-1>

10 parts of a polyester resin (Thermolack F-1, manufactured by Soken Chemical & Engineering Co., Ltd., solid content in a methyl ethyl ketone solution: 30% by mass), 12 parts of a conductive ITO micropowder (Pastlan ITO, manufactured by Mitsui Mining & Smelting Co., Ltd.), 7 parts of toluene and 3 parts of butanol are mixed and the mixture is thoroughly stirred using a paint shaker to prepare a coating solution B-1.

<Production of an Electrophotographic Laminate Film>

This coating solution B-1 is applied to a film provided with a PETG layer on each of the front side and backside and with a core made of PET as a substrate 5 (Merinex 342, manufactured by Du Pont, Vicat softening temperature of PETG on the surface: 85° C. and thickness: 100 μm) by using wire bar and dried at 90° C. for one minute to obtain a laminate film 5 on which a charge preventive layer having a film thickness of 0.5 μm is formed. The laminate film 5 has a surface resistance of $1.0 \times 10^7$ Ω/□. The laminate film 5 is used after cut into an A4size.

Next, a card 5 is produced in the same manner as in Example 1 except that the laminate film 5 is used in place of the laminate film 1. As to each step during the course of the process, evaluation of the laminate film 5 and the card 5 is made in the same manner as in Example 1.

The laminate film 5 generated blurring of characters under high-temperature and high-humidity conditions and is therefore poor in image quality (transferability). On the other hand, because of very small electrostatic adsorptive force, the laminate film 5 is superior in all of the discharge paper tray receiving ability, the loosening characteristics and laminating workability and therefore it is laminated almost without any dust being adsorbed and therefore the laminate quality is good.

The results of evaluation are shown in Table 1.

Comparative Example 3

A laminate film 6 is produced in the same manner as in Comparative Example 2 except that the coating solution B-1 is applied to the surface of a substrate 6 which is an ethylene/vinyl acetate copolymer film (Sunteck EVA: EF1530, manufactured by Asahi Chemical Industry, Vicat softening temperature: 66° C. and thickness: 100 μm). The laminate film 6 has a surface resistance of $3.0 \times 10^{13}$ Ω/□.

Next, it is tried to produce a card 6 in the same manner as in Example 1 except that the laminate film 6 is used in place of the laminate film 1. However, because the laminate film 6 has low film softening temperature, all samples wind around the fixing device of the color copier and a laminate film to which an image is fixed is not therefore obtained. For this, the subsequent evaluation can not be made.

The results of evaluation are shown in Table 1.

Example 4

<Preparation of an Image Receptor Layer Coating Solution B-2>

10 parts of a polyester resin (Folet FF-4, manufactured by Soken Chemical & Engineering Co., Ltd., solid content: 30% by mass), 0.05 parts of a crosslinking type methacrylate copolymer microparticle (MP-1000, manufactured by Soken Chemical & Engineering Co., Ltd., volume average particle diameter: 10 μm) as a matting agent, 0.5 parts of 2-(2-hydroxy-5-methylphenyl)-2H-benzotriazole (Sumisob 200, manufactured by Sumitomo Chemical Co., Ltd.) as a ultraviolet absorber, 0.1 parts of an antioxidant (Chelex-500, manufactured by Sakai Chemical Industry Co., Ltd.), 0.2 parts of a surfactant (Elegan 264 WAX, manufactured by Nippon Oil and Fats Co., Ltd.) and 0.6 parts of perchloropentacyclodecane as a flame retardant are added to a mixed solvent of 10 parts of toluene and 30 parts of methyl ethyl ketone and the mixture is thoroughly stirred to prepare an image receptor layer coating solution B-2.

<Production of an Electrophotographic Laminate Film>

The image receptor layer coating solution B-2 is applied to a film provided with a PETG layer on each of the front side and backside and with a core made of PET as a substrate 7 (Merinex 342, manufactured by Du Pont, Vicat softening temperature of PETG on the surface: 85° C. and thickness: 100 μm) by using wire bar and dried at 90° C. for one minute to obtain a laminate film 7 on which an image receptor layer having a film thickness of 2.0 μm is formed. The laminate film 7 has a surface resistance of $5.8 \times 10^9$ Ω/□. The laminate film 7 is used after cut into an A4size.

Next, a card 7 is produced in the same manner as in Example 1 except that the laminate film 7 is used in place of the laminate film 1. As to each step during the course of the process, evaluation of the laminate film 7 and the card 7 is made in the same manner as in Example 1.

The results are shown in Table 1.

Example 5

The image receptor layer coating solution B-2 that is used in Example 4 is applied to the front side and backside of a film (Diafix, manufacture by Mitsubishi Plastics Inc., Vicat softening temperature: 86° C., thickness: 100 μm) provided with the front side and backside made of PETG and with a core made of a polycarbonate resin as a substrate 8 by using wire bar and dried at 90° C. for one minute to obtain a laminate film 8 on which an image receptor layer having a film thickness of 2.0 μm is formed. The laminate film 8 has a surface resistance of $6.0 \times 10^9$ Ω/□. The laminate film 8 is used after cut into an A4size.

Next, a card 8 is produced in the same manner as in Example 1 except that the laminate film 8 is used in place of the laminate film 1. As to each step during the course of the process, evaluation of the laminate film 8 and the card 8 is made in the same manner as in Example 1.

The results are shown in Table 1.

Example 6

A laminate film 9 on one surface of which an image receptor layer having a film thickness of 2.0 μm is formed is produced in the same manner as in Example 4 except that the image receptor layer coating solution B-2 is applied to one surface of the substrate 7. The surface resistance of the image receptor layer of the laminate film 9 is $5.8 \times 10^9$ Ω/□ and the surface resistance of the backside of the laminate film 9 is $2.3 \times 10^{15}$ Ω/□. The laminate film 9 is used after cut into an A4size.

Next, a card 9 is produced in the same manner as in Example 1 except that the laminate film 9 is used in place of the laminate film 1. As to each step during the course of the process, evaluation of the laminate film 9 and the card 9 is made in the same manner as in Example 1.

The results are shown in Table 1.

Comparative Example 4

The substrate 7 in Example 4 is used as a laminate film 10 without carrying out the coating using the image receptor layer coating solution B-2. The surface resistances of the front side and backside of the laminate film 10 are $1.0 \times 10^{17}$ $\Omega/\square$ and $3.0\times10^{17}$ $\Omega/\square$ respectively. The laminate film 10 is used after cut into an A4size.

Next, a card 10 is produced in the same manner as in Example 1 except that the laminate film 10 is used in place of the laminate film 1. As to each step during the course of the process, evaluation of the laminate film 10 and the card 10 is made in the same manner as in Example 1.

The results are shown in Table 1.

Comparative Example 5

A biaxially oriented PET film (Lumirror 100T60, manufactured by Toray Industries, Inc, Vicat softening temperature: 240° C.) having a thickness of 100 μm is used as a substrate 11. The surface resistance of the substrate 11 is $1\times10^{16}$ $\Omega/\square$. The substrate 11 is cut into an A4size to produce a laminate film 11.

Next, a card 11 is produced in the same manner as in Example 1 except that the laminate film 11 is used in place of the laminate film 1. As to each step during the course of the process, evaluation of the laminate film 11 and the card 11 is made in the same manner as in Example 1. Because the laminate film 11 has a high Vicat softening temperature, it can not be laminated (bonded).

The results are shown in Table 1.

Example 7

The same procedures as in Example 1 are conducted except that the modification of a color copier DocuColor 1250 manufactured by Fuji Xerox Co., Ltd. is further remodeled such that the surface temperature of the laminate film when fixed is 125 to 130° C. and a color mirror image including a solid image is printed, to produce a laminate film 12 on which the image is formed.

Next, a card 12 is produced in the same manner as in Example 1 except that the laminate film 12 is used in place of the laminate film 1. As to each step during the course of the process, evaluation of the laminate film 12 and the card 12 is made in the same manner as in Example 1.

The results of evaluation are shown in Table 1.

Example 8

The same procedures as in Example 1 are conducted except that the modification of a color copier DocuColor 1250 manufactured by Fuji Xerox Co., Ltd. is further remodeled such that the surface temperature of the laminate film when fixed is 70 to 75° C. and a color mirror image including a solid image is printed, to produce a laminate film 13 on which the image is formed.

Next, a card 13 is produced in the same manner as in Example 1 except that the laminate film 13 is used in place of the laminate film 1. As to each step during the course of the process, evaluation of the laminate film 13 and the card 13 is made in the same manner as in Example 1.

The results of evaluation are shown in Table 1.

Example 9

The same procedures as in Example 1 are conducted except that the modification of a color copier DocuColor 1250 manufactured by Fuji Xerox Co., Ltd. is further remodeled such that the machine is shut down just before the fixing step and a color mirror image including a solid image is printed, to produce a laminate film 14 on which the unfixed image is formed.

Next, a card 14 is produced in the same manner as in Example 1 except that the laminate film 14 is used in place of the laminate film 1. As to each step during the course of the process, evaluation of the laminate film 14 and the card 14 is made in the same manner as in Example 1. In this example, the loosening characteristics can not be evaluated. As to the operability in aligning for lamination, it is very difficult to operate in such a manner as not to rub the unfixed toner image and the image is rubbed, so that the laminate image quality is slightly deteriorated.

The results of evaluation are shown in Table 1.

TABLE 1

| | Surface resistance of the laminate film ($\Omega/\square$) | Discharge paper tray receiving ability | Image quality (transferability) | Loosening/ laminating operability | Laminate quality (resistance to incorporation of dusts) | Laminating characteristics (peeling strength) | Laminate image quality (image slippage) |
|---|---|---|---|---|---|---|---|
| Example 1 | $2.8 \times 10^{10}$ | ◎ | ○ | ○/○ | ○ | ○ | ○ |
| Example 2 | $8.5 \times 10^{12}$ | ○ | ○ | ○/○ | ○ | ○ | ○ |
| Example 3 | $5.8 \times 10^{9}$ | ◎ | ○ | ○/○ | ○ | ○ | ○ |
| Comparative Example 1 | $1.0 \times 10^{14}$ | X | CX | X/X | X | ○ | ○ |
| Comparative Example 2 | $1.0 \times 10^{7}$ | ◎ | AX | ◎/◎ | ○ | ○ | ○ |
| Comparative Example 3 | $3.0 \times 10^{13}$ | Inter-machine jam | — | — | — | — | — |
| Example 4 | $5.8 \times 10^{9}$ | ○ | ○ | ○/○ | ○ | ◎ | ○ |
| Example 5 | $6.0 \times 10^{9}$ | ○ | ○ | ○/○ | ○ | ◎ | ○ |
| Example 6 | $5.8 \times 10^{9}$ (One surface) | Δ | ○ | Δ/Δ | Δ | ◎ | ○ |
| Comparative Example 4 | $1.0 \times 10^{17}$ | X | CX | X/X | X | ○ | ○ |
| Comparative Example 5 | $1.0 \times 10^{16}$ | ○ | ○ | ○/○ | ○ | X | ○ |
| Example 7 | $2.8 \times 10^{10}$ | ○ | ○ | ○/○ | ○ | ○ | ○ |
| Example 8 | $2.8 \times 10^{10}$ | ◎ | ○ | ○/○ | ○ | ○ | Δ |
| Example 9 | $2.8 \times 10^{10}$ | ○ (Shut down) | ○ | —/X | ○ | ○ | X |

According to the invention, the above-mentioned electrophotographic laminate film can be easily produced and a high quality image can be formed on the surface of the electrophotographic film. Moreover, since the laminate film is small in electrostatic adsorption, it is possible to produce an information recording medium which can be easily aligned with a core base material for lamination and is resistant to adhesion of dirt such as dusts. Further, it has sufficiently large laminating strength.

What is claimed is:

1. An information recording medium comprising:
   at least one electrophotographic laminate film in which a surface resistance of at least one surface is in a range of $10^8$ to $10^{13}$ $\Omega/\square$, and on which a toner image corresponding to information is formed; and
   an opaque core base material laminated on a surface of the electrophotographic laminate film, on which surface the toner image is formed.

2. The information recording medium of claim 1, wherein a Vicat softening temperature of a substrate in the electrophotographic laminate film is in a range of 70 to 130° C.

3. The information recording medium of claim 1, wherein the information is variable information.

4. The information recording medium of claim 3, wherein the variable information is personal information.

5. The information recording medium of claim 1, wherein a Vicat softening temperature of the core base material is in a range of 70 to 130° C.

6. The information recording medium of claim 1, wherein the core base material is provided with a semiconductor circuit inside the core base material or on a surface thereof.

7. The information recording medium of claim 1, wherein at least one of a substrate in the electrophotographic laminate film and the core base material contains a non-chlorine resin as a major component thereof.

8. The information recording medium of claim 1, further comprising at least one coating layer disposed on a surface of a substrate in the electrophotographic laminate film, on which surface the toner image is formed, wherein the coating layer has a surface resistance in a range of $10^8$ to $10^{13}$ $\Omega/\square$ and a Vicat softening temperature in a range of 70 to 130° C.

9. The information recording medium of claim 1, wherein a surface resistance of a surface of the electrophotographic laminate film, on which surface the toner image is formed, is in a range of $10^8$ to $10^{13}$ $\Omega/\square$.

10. The information recording medium of claim 1, wherein the electrophotographic laminate film contains at least one material selected from the group consisting of a surfactant, a high-molecular conductive agent and conductive microparticles.

11. The information recording medium of claim 1, wherein the electrophotographic laminate film contains a glossiness control layer on a surface thereof or has been processed by mechanical treatment for controlling glossiness.

12. The information recording medium of claim 1, wherein the electrophotographic laminate film contains a matting agent.

13. A method of producing an information recording medium, comprising:
    a latent image forming step of forming an electrostatic latent image corresponding to information on a surface of a latent image holding member;
    a developing step of developing the electrostatic latent image as a toner image;
    a transfer step of transferring the toner image to a transparent electrophotographic laminate film; and
    a laminating step of laminating a surface of the electrophotographic laminate film, on which surface the toner image is formed, with an opaque core base material,
    wherein a surface resistance of at least one surface of the electrophotographic laminate film is in a range of $10^8$ to $10^{13}$ $\Omega/\square$.

14. The method of claim 13, wherein a Vicat softening temperature of a substrate in the electrophotographic laminate film is in a range of 70 to 130° C.

15. The method of claim 13, wherein a Vicat softening temperature of the core base material is in a range of 70 to 130° C.

16. The method of claim 13, further comprising a fixing step of fixing the transferred toner image on the surface of the electrophotographic laminate film between the transfer step and the laminating step.

* * * * *